July 21, 1942.  G. C. BERGTHOLDT, JR  2,290,527
VALVE ADJUSTING MECHANISM
Filed May 29, 1941
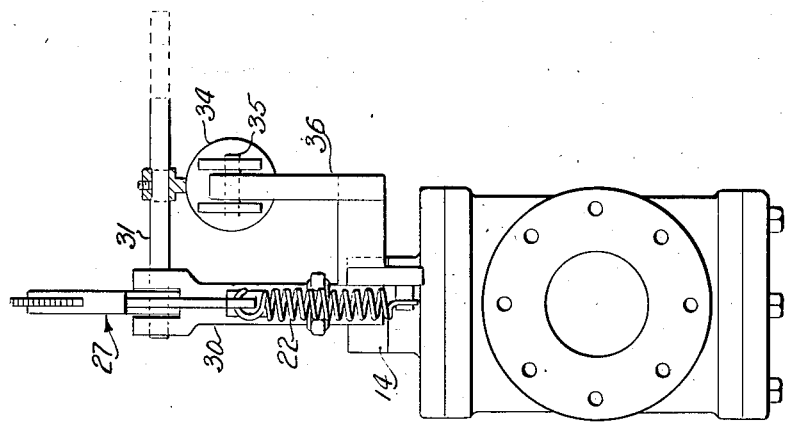
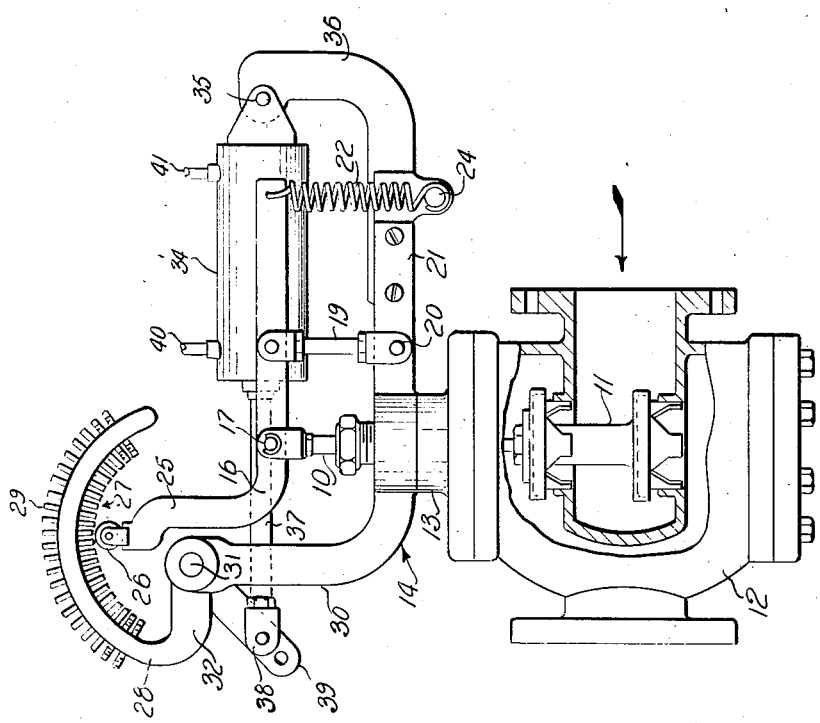
Inventor
G. C. Bergtholdt Jr.
By
Charles A. Lind
Attorney Patented July 21, 1942

2,290,527

UNITED STATES PATENT OFFICE 2,290,527

VALVE ADJUSTING MECHANISM

George C. Bergtholdt, Jr., Tulsa, Okla., assignor to Webster Engineering Company, Tulsa, Okla., a corporation of Delaware Application May 29, 1941, Serial No. 395,711

3 Claims. (Cl. 137—139)

It is customary in combustion control systems to provide for the adjustment of the fuel supply valve in accordance with the demand for heat and it is the object of the present invention to provide an improved valve adjusting mechanism for the purpose stated. More particularly it is an object of the invention to provide a unit mechanism that may be readily applied to existing valves and that shall embody means for readily changing the degree of opening and closing of the valve for any given movement imparted to an operating part of the mechanism.

The various features of novelty and invention can best be explained in connection with the accompanying drawing wherein the preferred form of the invention is shown. Fig. 1 shows the improved valve operating mechanism combined with a well known type of gas valve and Fig. 2 is an end elevation of Fig. 1.

In the drawing, 10 indicates the valve stem of a gas valve 11 contained in a housing 12 adapted to be interposed in a gas supply line leading to a burner, not shown. The valve housing has a bonnet 13 through which the valve stem extends in the usual manner. The valve as a whole is to be taken as illustrative of any preferred type of valve having a valve stem for operating the valve proper.

The valve adjusting mechanism comprises an elongated support 14 adapted to be secured to the bonnet 13 in any preferred way. 16 indicates a lever which at 17 is fulcrumed to the valve stem 10 and which is carried by a link 19 which at 20 is pivoted to an arm 21 of the support 14. A spring 22 connected to the lever at 23 and to the arm 21 at 24 tends to turn the lever in a valve opening direction. The lever has an upturned arm or extension 25 at the upper end of which is mounted a roller 26 for contacting with a cam generally indicated at 27 and comprising a curved member 28 through which extends a row of adjustable screws 29 for varying the effective contour of the cam as conditions may require.

At the upper end of an upright arm 30 forming part of the support 14 is journaled a shaft 31 to which the cam 27 is connected as by radially extending arm 32 anchored to the shaft. The curved member 28 is eccentric with respect to the axis of the shaft 31, the point with respect to which said member is concentric being at the right of the shaft 31 as viewed in Fig. 1. The effective eccentricity of the member 28 can be readily varied by adjusting the screws 29 as will be readily understood.

The means for turning the shaft comprises a piston in a cylinder 34 pivoted at 35 to an arm 36 forming part of the support 14. The piston rod is indicated at 37 and is connected at 38 to a crank 39 fixedly secured to the shaft 31. Motive fluid such as air under pressure is admitted to the cylinder by pipes 40 and 41 leading from a control device (not shown) whose function is to admit motive fluid to one or the other of the said pipes in accordance with a change in demand for heat whereby to adjust the position of the valve 11 accordingly through the instrumentalities already described. By appropriate connections the shaft 31 may also be utilized to operate an air damper as a flue damper as will be readily understood.

From the foregoing description it will be seen that the present invention provides a relatively simple and practical valve adjusting means which, although having special utility with combustion control equipment, may have utility in other relations.

What I claim is:

1. In apparatus of the class described, the combination with a valve housing for a valve having a stem extending upwardly out of the housing, of a support adapted for securement to said housing, a shaft journaled on said support, a lever having a horizontally extending portion and a vertically extending portion, means turnably connecting the horizontally extending portion of said lever to said support, a cam movable with said shaft and comprising a curved member against the concave side of which the upper end of the upright portion of the lever normally abuts, means supported by the support for turning said shaft, and means for operatively connecting the lever to said valve stem whereby said valve may be moved when the lever is moved.

2. The combination with a valve having a stem and a housing for the valve, of a valve adjusting mechanism carried by said housing, said mechanism comprising a support mounted on the housing, a fluid pressure cylinder one end of which is pivotally secured to said support and having a piston rod extending from its other end, an arcuate cam turnably mounted on said support, means comprising a crank arm to which the piston rod is connected for rocking said cam, a lever pivotally connected intermediate its ends to said stem and at one side of its pivot being turnably secured to said support and at the opposite side of said pivot having an angular extension whose free end is in the path of movement of said cam for actuation by the cam, and yieldable means acting on the lever to press the free end of said extension against the cam.

3. The combination with a valve having a stem and a housing for the valve, of a valve adjusting mechanism carried by said housing, said mechanism comprising a support mounted on the housing, a fluid pressure cylinder one end of which is pivotally secured to said support and having a piston rod extending from its other end, an arcuate cam turnably mounted on said support, means comprising a crank arm to which the piston rod is connected for rocking said cam, a lever pivotally connected intermediate its ends to said stem and at one side of its pivot being turnably secured to said support and at the opposite side of said pivot having an angular extension whose free end is in the path of movement of said cam for actuation by the cam, and yieldable means acting on the lever to press the free end of said extension against the cam, said cylinder being positioned at one side of said lever.

GEORGE C. BERGTHOLDT, Jr.